United States Patent [19]

Smith et al.

[11] Patent Number: 5,333,046
[45] Date of Patent: Jul. 26, 1994

[54] DIAGONAL PATHLENGTH CONTROL

[75] Inventors: Irl W. Smith, Newton; Terry A. Dorschner, Newton Centre; Vincenzo D. Pitruzzella, Maynard, all of Mass.

[73] Assignee: Raytheon Company, Lexington, Mass.

[21] Appl. No.: 412,457

[22] Filed: Aug. 27, 1982

[51] Int. Cl.$^5$ ............................................. G01C 19/64
[52] U.S. Cl. ...................................... 356/350; 372/94
[58] Field of Search ........................... 372/94; 356/350

[56] References Cited

U.S. PATENT DOCUMENTS

| | | | |
|---|---|---|---|
| 3,533,014 | 10/1970 | Coccoli et al. | 331/94.5 |
| 3,841,758 | 10/1974 | Gievers | 356/350 |
| 4,152,071 | 5/1979 | Podgorski | 356/350 |
| 4,281,930 | 8/1981 | Hutchings | 356/350 |
| 4,397,027 | 8/1983 | Zampiello et al. | 372/94 |
| 4,407,583 | 10/1983 | Simms | 356/350 |
| 4,410,274 | 10/1983 | Ljung | 372/94 |
| 4,470,701 | 9/1984 | Smith | 372/94 |
| 4,477,188 | 10/1984 | Stiles et al. | 372/94 |

*Primary Examiner*—Nelson Moskowitz
*Attorney, Agent, or Firm*—Walter F. Dawson; Richard M. Sharkansky

[57] ABSTRACT

A ring laser gyro uses a nonplanar path having at least one plane of mirror symmetry and two pathlength control mirrors in order to reduce scatter variations occurring during the operation of the laser gyro. The mirrors used to produce such path are fixed to an isotropic supporting block having passages therein that define the path segments and the mirrors are moved out or in by the expansion or contraction of the block. The two pathlength control mirrors are disposed diagonally opposite each other on the plane of mirror symmetry, and are placed on substrates whose positions are controllable, each substrate being coupled to means for controlling the positions of the substrates as a function of the pathlength. With such a mirror configuration, the pathlength may be held constant by a suitable control means and the relative movement of the mirrors constrains movement, with respect to the mirrors, of the beams circulating in the path to directions perpendicular to the planes of incidence on the mirrors. This causes the beams to sample substantially the same scatter points, normally present on the mirror surfaces, with substantially the same phase throughout the range of movement of the beams.

3 Claims, 6 Drawing Sheets

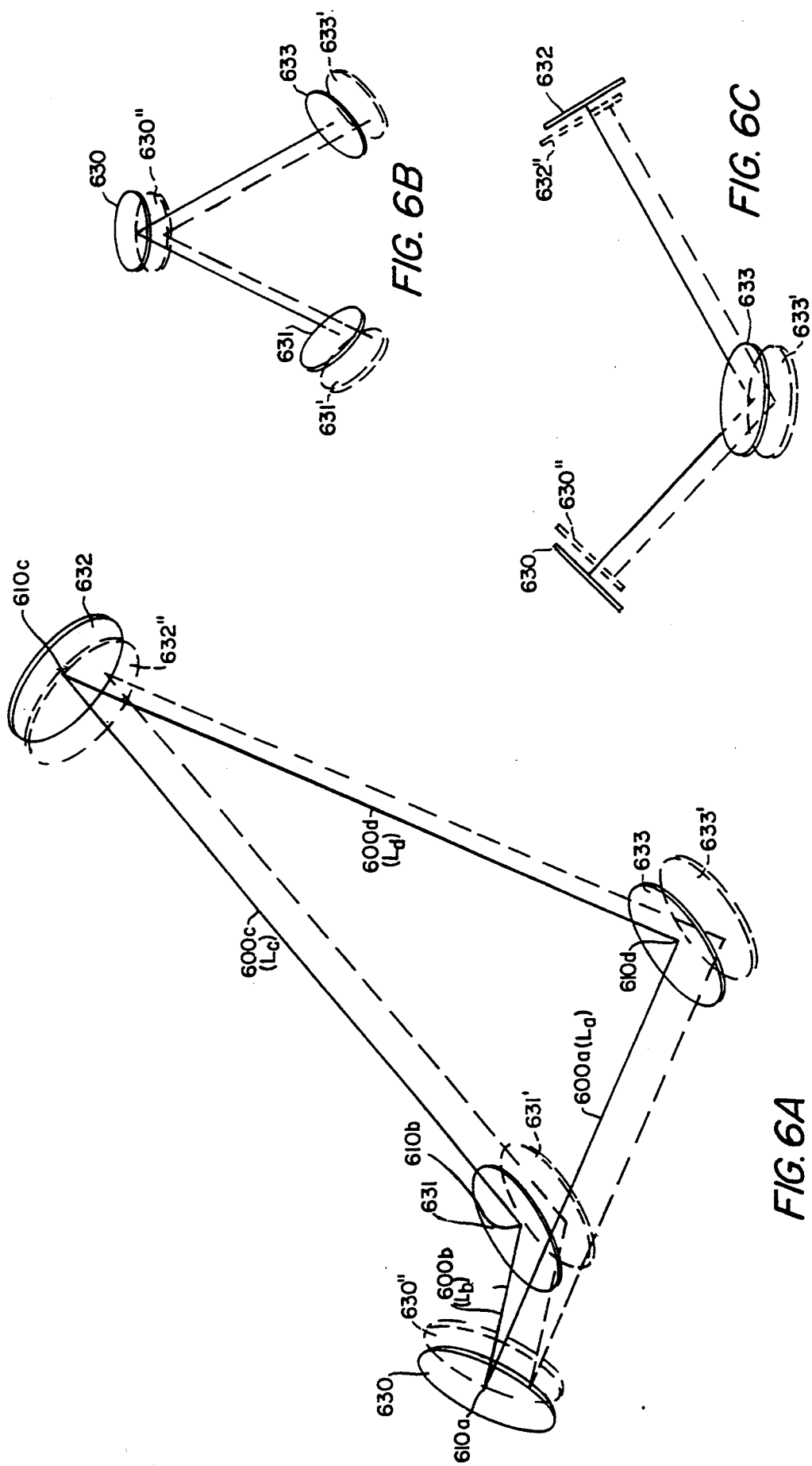

DIAGONAL PATHLENGTH CONTROL

BACKGROUND OF THE INVENTION

Backscatter is an important error source in laser gyros. Backscatter may be understood as a retroreflection of a portion of traveling beams in a laser gyro from scatter points located along the path of the beams and typically found on the surfaces of any solid optical elements within the path. Backscatter results in the coupling of the counter-propagating beams in the gyro and is the primary source of the lock-in problem for two-frequency gyros. Lock-in results in the non-linear variation in the beat frequency for rotation of the laser gyro within range of slow rotation rates. Some schemes to prevent lock-in have concentrated on the backscatter problem. For instance, in U.S. Pat. No. 4,152,071 to Podgorsky, the mirrors are moved under control of a feedback system to a position which minimizes backscatter. In U.S. Pat. No. 4,281,930 to Hutchings, the mirrors forming the laser gyro path are phase dithered to cause the beams to scan the face of the mirrors and thus periodically vary the phase of the scatter at each mirror to reduce lock-in. In U.S. Pat. No. 3,533,014 to Coccoli et al., the coupling of the counter-propagating beams is reduced by oscillating in a predetermined way one of the mirrors in a shear mode.

The main problem with all of these schemes is that variations in the scatter level still remain. Since these variations cannot be predicted, they cannot be compensated. For circularly polarized, or four-frequency, laser gyros these variations then result in the drift of the output signal which is used to indicate rotation rate of the laser gyro.

SUMMARY OF THE INVENTION

The present invention provides for a ring resonator structure which maintains a constant pathlength while reducing scatter variations. This is achieved by using a path that has at least one plane of symmetry and by placing the reflection point of two pathlength control mirrors on the plane of symmetry. The path symmetry constrains movements of the beams to directions perpendicular to the planes of incidence at each mirror, thus preserving the phase of the scatter from each mirror and therefore the resultant total scatter.

More specifically, this invention provides for means for producing a ring resonator comprising a plurality of reflectors forming a path having at least one plane of mirror symmetry, two of said reflectors being positioned with their reflective surfaces opposite each other orthogonal to the symmetry plane, and means for controlling the position of these two reflectors. This structure may be advantageously used in a ring laser gyro, where the symmetrical path has portions disposed on two intersecting planes for providing circular birefringence, via image rotation, to the circulating modes of electromagnetic energy. Means for producing a nonreciprocal (direction-dependent) circular birefringence to said modes are also provided to produce a four-frequency, or multi-oscillator, ring laser gyro.

BRIEF DESCRIPTION OF THE DRAWINGS

The present invention may be better understood with reference to the accompanying drawings wherein:

FIGS. 6A-C illustrate the confinement of beam movement in a direction perpendicular to the incidence plane for the more general case of a nonplanar path having only one plane of mirror symmetry.

DESCRIPTION OF THE PREFERRED EMBODIMENT

Figure 1:
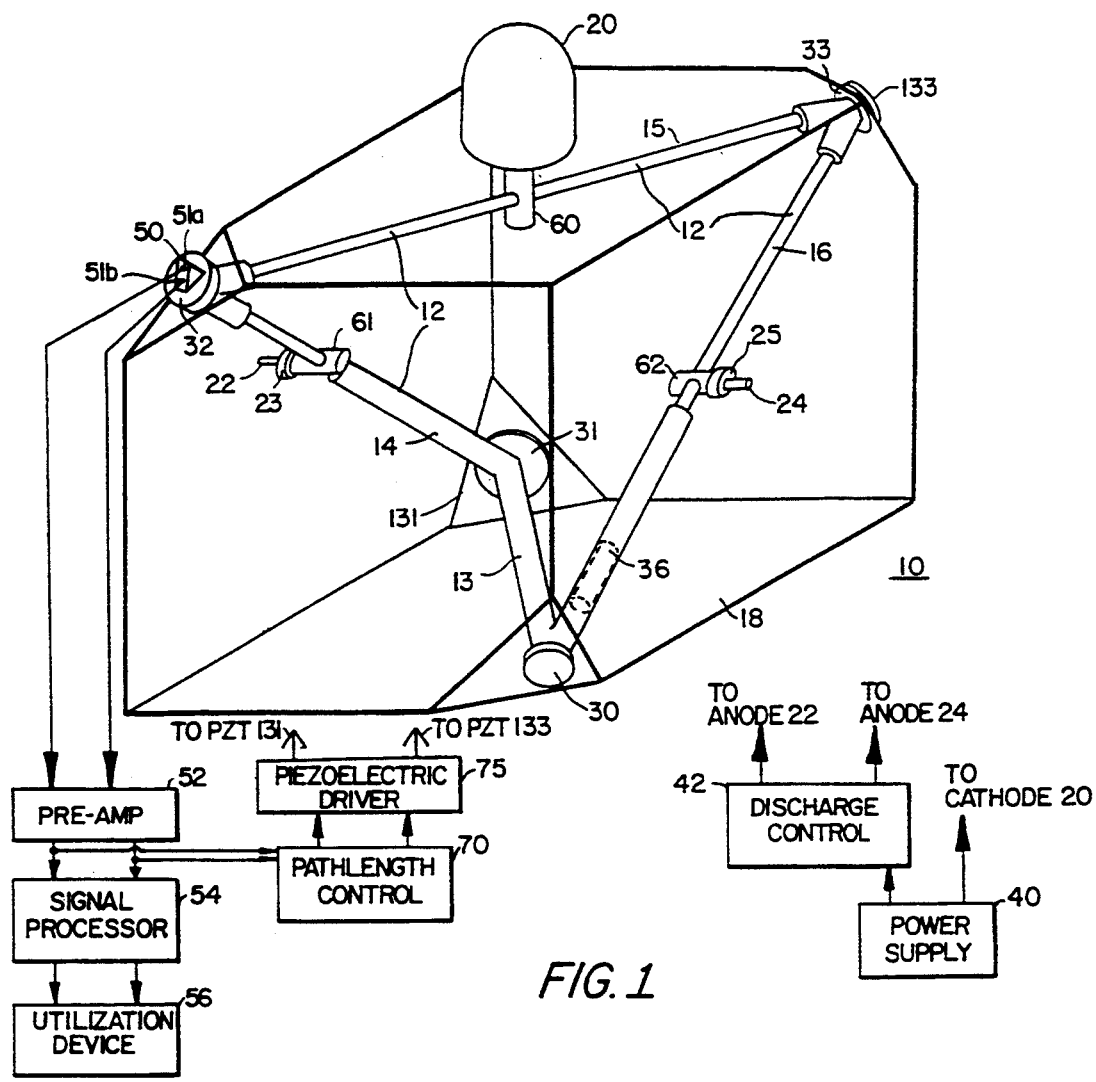
FIG. 1 is a partly diagrammatic view of the laser gyro system of the present invention.

Referring now to FIG. 1, there is shown the laser gyro system 10 of the present invention. The ring laser gyro nonplanar path 12 is formed by passages 13, 14, 15 and 16 and mirrors 30, 31, 32 and 33. Passages 13, 14, 15 and 16 are drilled in gyro block 18. Mirrors 30, 31, 32 and 33 are located at the corresponding intersections of passages 13 through 16 and are mounted on the planes resulting from cutting off corners of block 18. The intersection of the centerlines of any two adjacent passages lie in a corresponding one of these planes. The aforesaid intersection points form the vertices of a regular tetrahedron, resulting in a ring path which is equiangular as well as equilateral. The planes where the mirrors are mounted are each perpendicular to a corresponding plane of incidence defined by any two adjacent passages in block 18. Stated alternatively, the normal of the plane of each cut portion bisects the angle formed by the two passages incident thereon. Mirrors 31 and 33 are placed on piezoelectric actuators 131 and 133, respectively, and are part of the pathlength control system, which is a feedback network which maintains the optimum length of ring path 12 constant and will be described in more detail later. Mirrors 30 through 33 each comprise dielectric stacks of alternating layers of high and low dielectric constant deposited on a polished substrate to form a reflector at the operative wavelength, as is known in the art. Preferably, one of the mirrors, such as mirror 30, is spherical in order to control the mode size of the beams circulating in the ring path 12, as is known in the art. Gyro block 18 is a cubic block of low expansion material such as a machinable glass-ceramic material commercially available as Zerodur by Schott Optical Company.

Passages 13 through 16 are filled with a gain medium suitable for laser operation such as a mixture of helium and neon for operation at the .6328 micrometer wavelength. A laser beam is produced by an electrical discharge generated between cathode 20 and anodes 22 and 24 by power supply 40 and discharge control 42. The cathode is connected directly to the negative electrode of power supply 40, while anodes 22 and 24 are each connected to a separate positive electrode of discharge control 42 whose function is to maintain an equal discharge current in both discharge regions, i.e. a first region defined between cathode 20 and anode 22 and a second region defined between cathode 20 and anode 24, in order to minimize deviations of the indicated rotation rate due to the Fresnel-Fizeau effect, as is known in the art.

Figure 7:
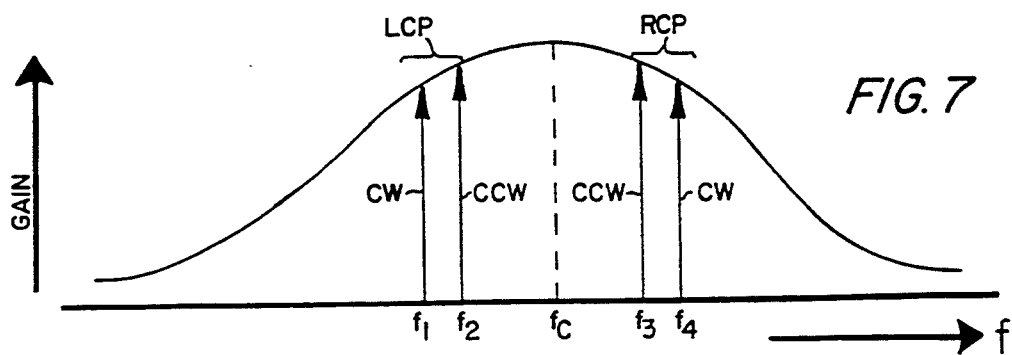
FIG. 7 shows the mode component distribution useful in understanding the operation of the laser gyro of the present invention.

The laser beam thus generated includes counter-propagating beam components of the predetermined mode of electromagnetic energy. The image rotation imparted to the counter-propagating beam components by the nonplanar path provides a reciprocal (direction-dependent) circular birefringence which results in a frequency splitting of the selected mode into two circularly polarized mode component pairs. Referring now to FIG. 7, a first pair, comprising clockwise (CW) and counterclockwise (CCW) mode components f1 and f2 which are, for instance, left-hand circularly polarized (LCP), is separated in frequency from a second pair, comprising counterclockwise and clockwise mode components f3 and f4 which are right-hand circularly polarized (RCP). A Faraday rotator 36 is placed in one of the passages, here shown as passage 16, to provide a nonreciprocal (direction-dependent) polarization rotation to produce a frequency splitting between counter-propagating components in each of the pairs, for instance between f1 and f2 in the LCP pair, and f3 and f4 in the RCP pair. This is usually referred to as the Faraday bias. A more detailed description of such a circularly polarized gyro using a nonplanar path may be found in U.S. Pat. No. 4,110,045, issued Aug. 29, 1978 to Smith, Jr. et al. and assigned to the present assignee. Alternatively, the Zeeman effect may be used to provide the direction-dependent polarization rotation. This is achieved by providing a magnetic field having a component along the optic axis within the gain medium in the discharge region. A more detailed description of a gyro using the Zeeman splitting as the means for producing the Faraday bias may be found in U.S. Pat. No. 4,229,106, issued Oct. 21, 1980, to Dorschner et al., and assigned to the present assignee. As a third alternative, in place of Faraday rotator 36, one or more of the mirrors, for example mirror 30, may include a magnetized layer, such as manganese bismuth, in which the magnetic field is made perpendicular to the plane of incidence in order to provide the requisite direction-dependent polarization rotation. A more detailed description of magnetic mirrors suitable in this application may be found in U.S. patent application Ser. No. 257,303 filed on Apr. 23, 1981, by Statz et al. and assigned to the present assignee.

One of the mirrors, for instance mirror 32, is made partially transmitting in order to extract the modes circulating in path 12. Output optics 50 is formed on output mirror 32 and is used to combine the counter-propagating mode components and isolate each polarization on separate diodes, shown as diodes 51a and 51b in FIG. 1, in order to detect the beat frequencies between the counter-propagating mode components for each polarization, i.e. $(f_2-f_1)$ and $(f_4-f_3)$. The two resulting signals are preamplified in preamp 52 before being fed to signal processor 54 where an output signal indicative of the rotation rate is generated, for instance, by subtracting one beat frequency from the other to remove the Faraday bias. The output signal thus generated is then coupled to utilization device 56, which may include a visual display or other operator interface. A more detailed description of suitable output optics 50 may be found in U.S. Pat. No. 4,141,651, issued Feb. 27, 1979 to Smith et al. and assigned to the present assignee.

The pathlength control feedback network uses the DC signal components available at preamplifier 52, which indicate the relative intensities of the circularly polarized mode component pairs. These DC signals are coupled to pathlength control 70 which produces an appropriate error signal as a function of the intensities. This is done to maintain the mode components corresponding to the two circularly polarized pairs, i.e. $f_1$ and $f_2$ for the LCP pair and $f_3$ and $f_4$ for the RCP pair, symmetrically within the bandwidth of the gain medium. The error signal produced by pathlength control 70 is then split equally and applied to piezoelectric driver 75 to produce two voltage signals which are applied to, respectively, piezoelectric actuators 131 and 133. The voltage applied causes a corresponding contraction or expansion of the piezoelectric actuator, thus moving the mirror surfaces of mirrors 31 and 33 in directions which compensate for any change in pathlength. A more detailed description of pathlength control is found in U.S. Pat. No. 4,108,553 issued Aug. 22, 1978, to Zampiello et al. and assigned to the present assignee.

Cathode 20 comprises a substantially spherical conductive envelope of a material suitable for the generation of free electrons. Cathode 20 is hermetically sealed to the center of one of the faces of cube 18 adjacent passage 15. Cathode 20 is coupled to ring path 12 through auxiliary passage 60 which is drilled to intersect passage 15.

Anodes 22 and 24 each comprise a conductive electrode coupled to ring path 12 through auxiliary passages 61 and 62, respectively, drilled to intersect passages 14 and 16. The ends of electrodes 22 and 24 do not intersect passages 14 and 16, and stop a short distance therefrom. Electrodes 22 and 24 are held in place by seals 23 and 25 which prevent leaks in the gain medium. The diameter of the inactive region of the passages, that is, the portion of passages 13, 14 and 16 between electrodes 22 and 24 on the opposite side from cathode 20, is of a size larger than the diameter of the active region, that is the portion of passages between the two electrodes 22 and 24 and cathode 20, to ease manufacturing tolerances and to reduce diffraction losses of the circulating beams.

As mentioned hereinabove, backscatter results in the coupling of the counter-propagating beams of the laser gyro. This may be understood as a pulling of the frequency of those mode components propagating in one direction by the light backscattered from mode components travelling in the opposite direction. The effect of backscatter on the frequency of the circulating modes is dependent on both the intensity and phase of the scattered mode component. The total scatter signal corresponding to each mode component is the resultant of the vector sum of all the corresponding scatter components arising from the various scatter centers throughout the ring path. In the presence of a scatter signal of predetermined intensity and phase, the effect on the output signal of the laser gyro, i.e. the difference of the difference signals, $F_{out}=(f_4-f_3)-(f_2-f_1)$, is the presence of an additive component in the output frequency which is not an indication of rotation. If this component were to remain truly constant, it could be compensated. The problem occurs when the circulating beams propagating in the gyro move relative to the mirror surfaces. Then, the intensities and phases of the individual scattered components will vary, resulting in a variation of the resultant scatter signal and a corresponding variation of the gyro output $F_{out}$ which, due to its unpredictable value, cannot be easily compensated and therefore constitutes a drift in the output signal of the laser gyro.

Typically, the beam size of the modes propagating in the laser gyro are two or three orders of magnitude greater than the operating wavelength. For a wavelength of 0.6328 micrometers the diameter of the beam may be 500 micrometers. The beam cross-section is relatively large compared to the source of scatter, and typically many scatter points are sampled by the beam. Under normal conditions, the beam can move with respect to any mirror surface by only an amount small compared to the beam diameter; thus the number of scatter points encountered does not change much. However, if the movement of the beam is parallel to the incidence plane, the net phase of the light scattered from these scatter points does change.

Figure 2A:
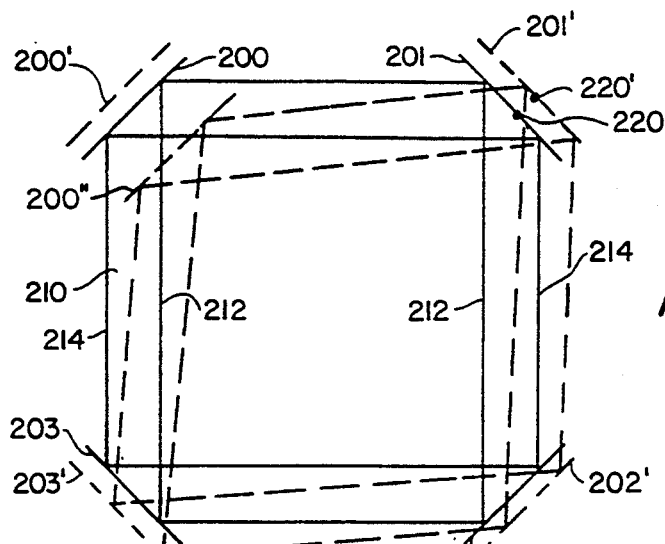
FIG. 2A illustrates the problem of using only one pathlength control (PLC) mirror in a square ring path which results in variations of the backscatter signal.
Figure 2B:
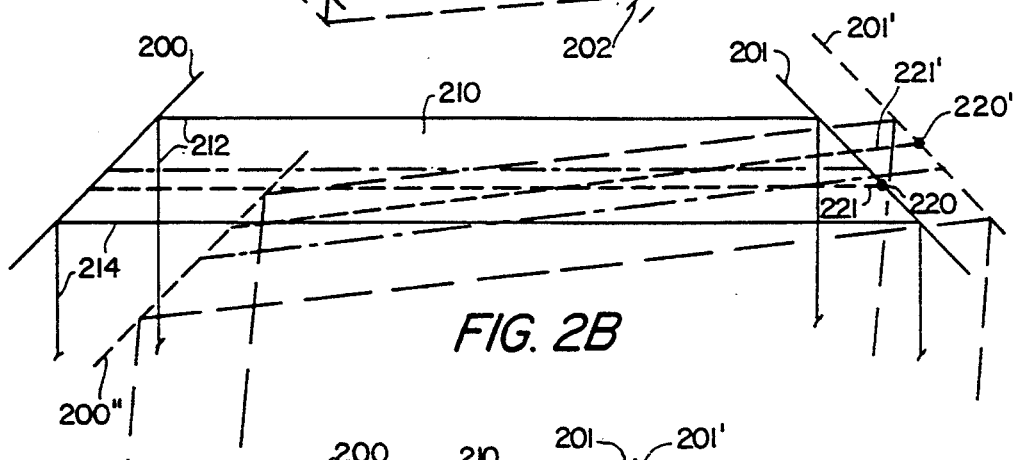
FIG. 2B is an enlarged view of the significant portion of the ring path of FIG. 2A.

This may be better understood with reference to FIGS. 2A and 2B which show diagramatically a planar ring utilizing only one pathlength control (PLC) mirror, as is currently done in the art. It should be emphasized that the movements of the mirrors and of the corresponding beams in FIGS. 2-6 are greatly exaggerated for illustration purposes. In an operating laser gyro, the beam movements are small and, as stated above, the group of scatterers that the beam samples does not change much. Mirrors 200, 201, 202 and 203, supported by a block (not shown), form a square optical resonant cavity with beam 210 propagating therein. Rays 212 and 214 are shown as the boundary rays which define beam 210. Rays 212 and 214 alternate their relative position with respect to the center line of beam 210 after reflection at each mirror. Mirror 201 is shown as having one scatter center 220 which is intersected by ray 221 and gives rise to backscatter having a phase with respect to mirror 200 which is a function of the optical length of ray 221. Scatter center 220 can be thought of as the resultant equivalent scatter point for all the scatter centers sampled by beam 210. As the block expands, mirrors 201, 202 and 203 move outwardly to new positions marked 201', 202' and 203'. The relative amount of mirror movement is shown greatly exaggerated for clarity. In the absence of pathlength control, mirror 200 would also move out to position 200', but instead is moved in the opposite direction under control of a pathlength controller in order to maintain the total pathlength constant. Pathlength control mirrors are referred to as PLC mirrors. For an expansion such as that shown in FIGS. 2A and 2B, PLC mirror 200 is moved to position 200''. The square path thus becomes a rhombic one and beam 210 is moved in the plane of incidence across the surface of mirrors 201 and 203. Small movement of the beam parallel to the plane of incidence causes beam 210 to strike substantially the same group of scatterers; thus the intensity of the portion of the beam that is backscattered remains substantially the same. However, the phase of the backscattered portion does change. This may be seen in FIG. 2A and FIG. 2B, which is an expanded view of the region between mirrors 200 and 201, by considering that scatterer 220 is now moved to position 220' by movement of mirror 201 to position 201' and that movement of beam 210 causes the optical length of backscattered ray 221' to change since the relative position of mirrors 200 and 201 causes scatter point 220 to be sampled in the first instance by a ray which is longer, being inside the optic axis of beam 210, and in a second instance a ray which is shorter, being outside the optic axis of displaced beam 210. The optic axis may be considered to be the centerline of beam 210.

Figure 2C:
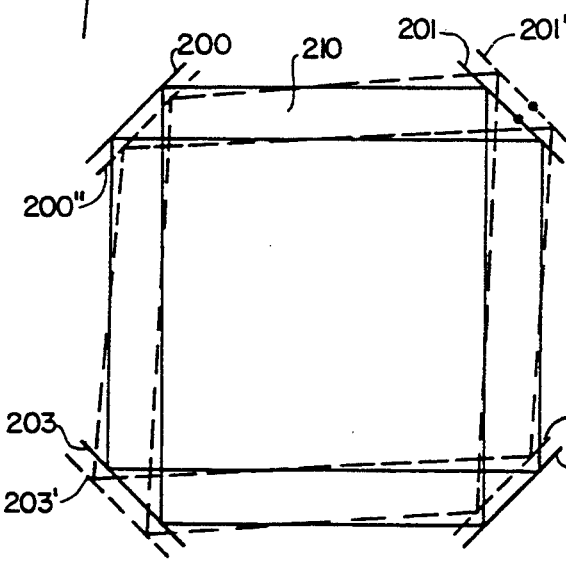
FIG. 2C illustrates the solution to the backscatter variation problem in a square ring path using two PLC mirrors along a mirror symmetry plane.
Figure 2D:
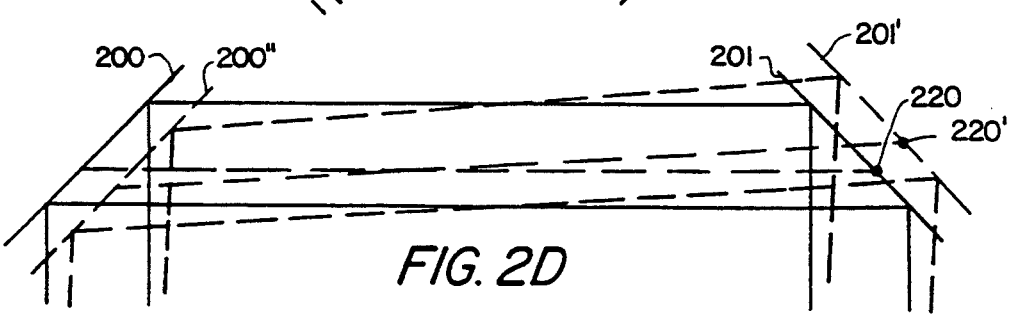
FIG. 2D is an enlarged view of the significant portion of the ring path of FIG. 2C.

Referring now to FIG. 2C, there is shown how the problem of changing the scatter distribution is solved by using in a planar ring similar to that of FIG. 2A, one additional PLC mirror, here mirror 202, disposed diagonally opposite the first PLC mirror 200. As mirror 201 and 203 expand outwardly to positions 201' and 203', PLC mirrors 200 and 202 move inwardly to maintain a constant optical pathlength. By splitting the amount of inward travel equally between the two PLC mirrors, it can be appreciated that beam 210 is incident on all mirrors at exactly the same points for any range of PLC mirror movement. This may be better seen in FIG. 2D, which is an expanded view of the region between mirrors 200 and 201. The result in this case is that the scatter points, here represented by typical effective scatter point 220, interact with a ray of beam 210 which has the same radial displacement relative to the optic axis of beam 210, and therefore, the backscattered ray has the same optical pathlength for the two positions of the mirrors. This causes the backscattered ray to have the same intensity and phase for all mirror movements within the range of movement of the PLC mirrors. To state it another way, movement of two PLC mirrors in a direction along the symmetry plane of the ring path does not change the distribution of the scatter, thus the level of scatter will remain constant. Furthermore, since the motion does not change the symmetry and since the pathlength is held constant, the phase of the scatter likewise remains constant.

Figure 3A:
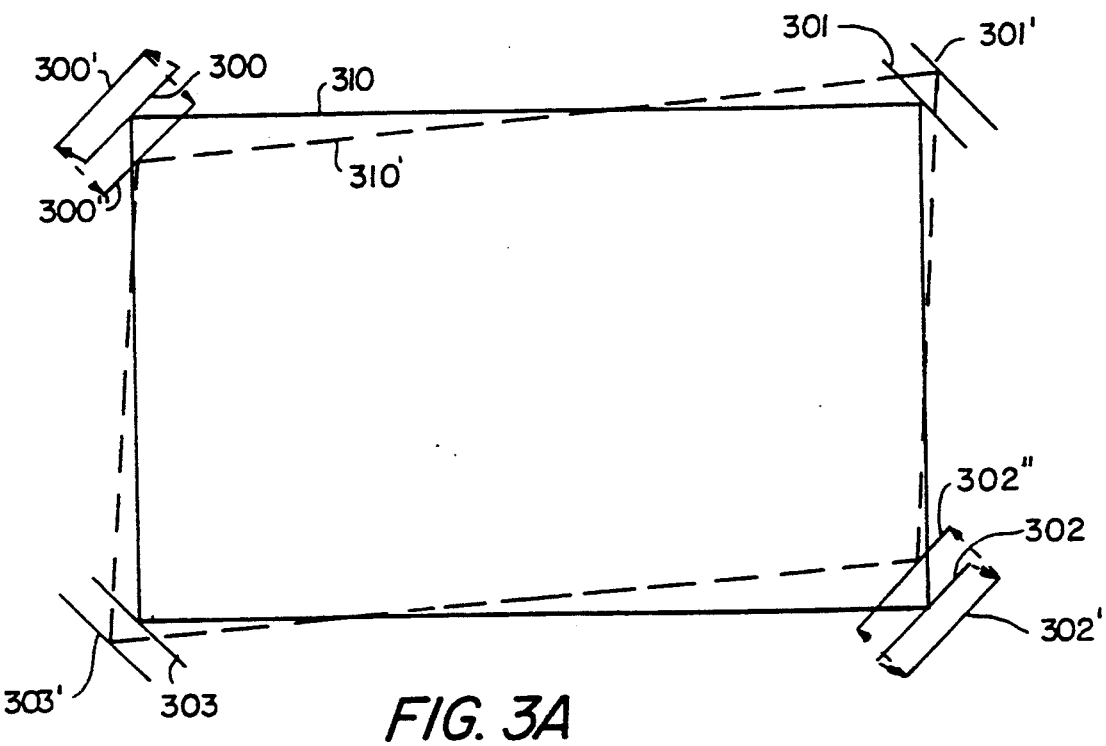
FIG. 3A illustrates the problem of beam movement in the plane of incidence when two PLC mirrors are disposed on a plane which is not a mirror symmetry plane.
Figure 3B:
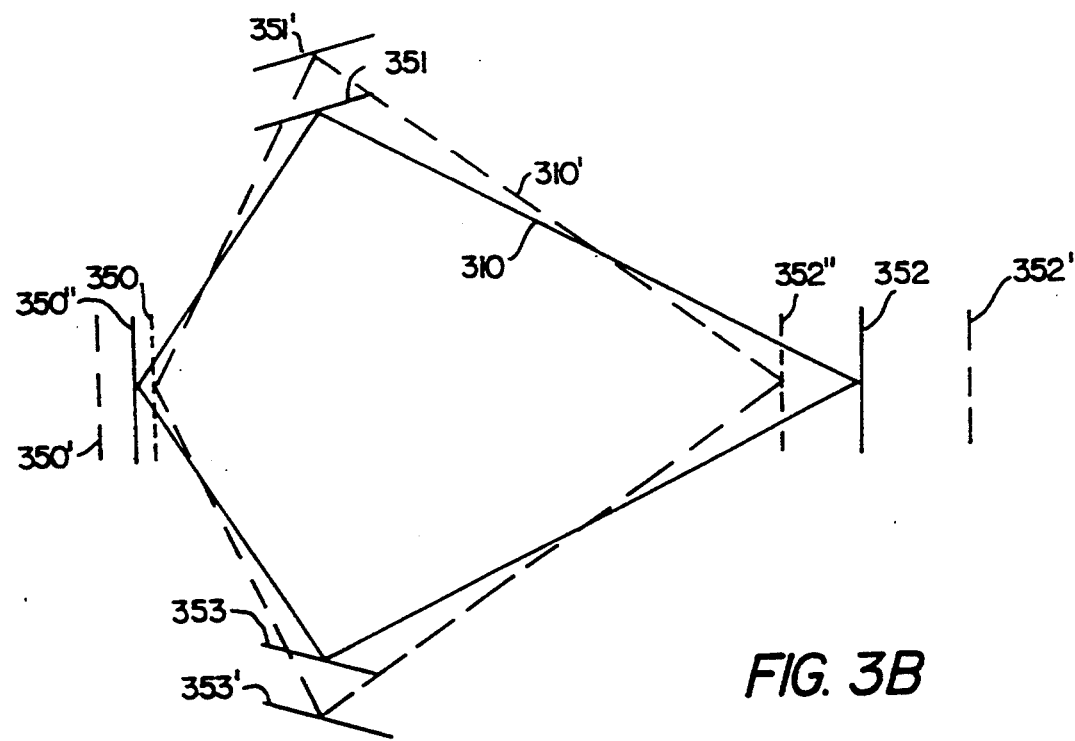
FIG. 3B illustrates the confinement of the beam to the same incidence region when the two PLC mirrors are disposed on a plane of mirror symmetry.

The square ring path of FIGS. 2A and 2B has two planes of mirror symmetry, each plane perpendicular to one diagonal of the square formed by the path. FIGS. 3A and 3B show that similar results are obtained with planar geometries other than a square. FIG. 3A shows a planar rectangular ring path formed by appropriately placed mirrors 300, 301, 302 and 303. This ring has no plane of mirror symmetry. Use of two PLC mirrors, for instance 300 and 302, in this geometry still leads to a scanning of the beam, here shown as ray 310 for simplicity, in the plane of incidence on mirrors 300 and 302 as it moves from its initial position to position 310' due to, for instance, uniform thermal expansion, followed by diagonal pathlength control. FIG. 3B, by contrast, shows a planar ring path formed by mirrors 350, 351, 352 and 353. This ring does have one plane of mirror symmetry which is perpendicular to the plane of the ring and includes the incidence points on two of the mirrors, here shown as 350 and 352. If the mirrors on the symmetry plane are selected to be the PLC mirrors, it can be seen that as mirrors 351 and 353 are moved outward by expansion, the compensating motion of mirrors 350 and 352 maintains the beam on the same incidence point on all mirrors, at their new positions 350' through 353', thus maintaining the same phase and intensity of the backscatter throughout the range of movement of the PLC mirrors. That there is a proper ratio E of the relative movements of PLC mirrors 350 and 352 such that the original incidence points can be maintained, may be understood by considering the following. If PLC mirrors 350 and 352 are moved inward by equal amounts, then clearly the incidence points will move in a direction parallel to the plane of incidence. However, mirror 350 can now be moved outward and mirror 352 can be moved further inward until the original incidence point is found.

Figure 4A:
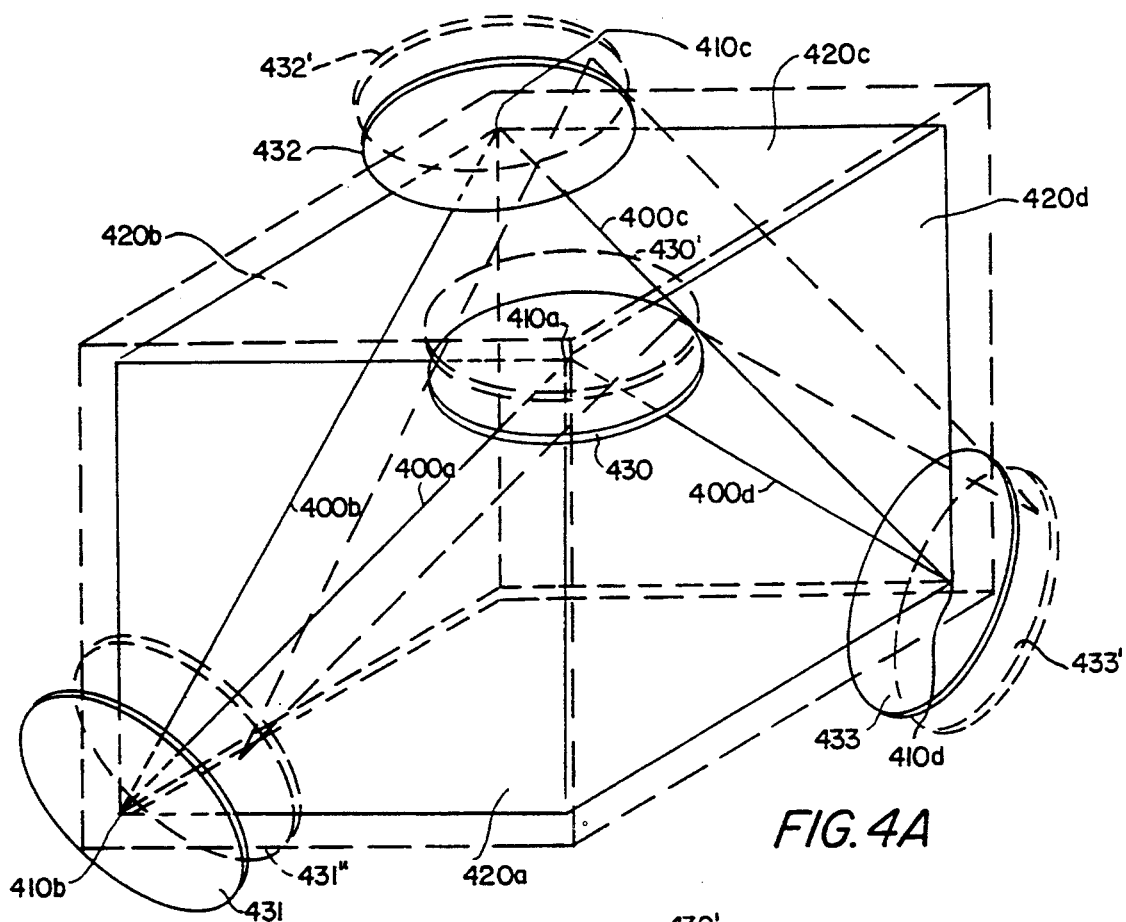
FIGS. 4A-C illustrate the backscatter variation problem of a single PLC mirror in a nonplanar rhombic path.
Figure 4B:
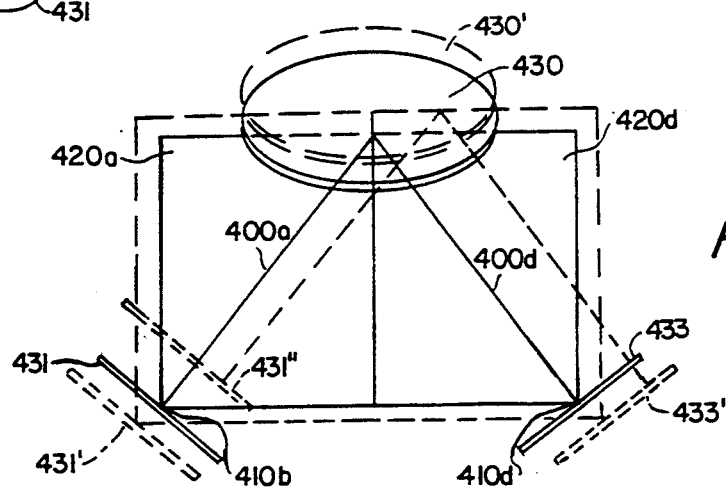
Figure 4C:
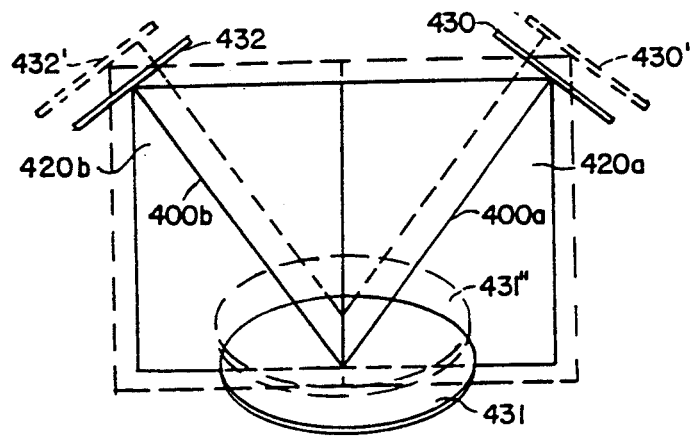
Figure 5A:
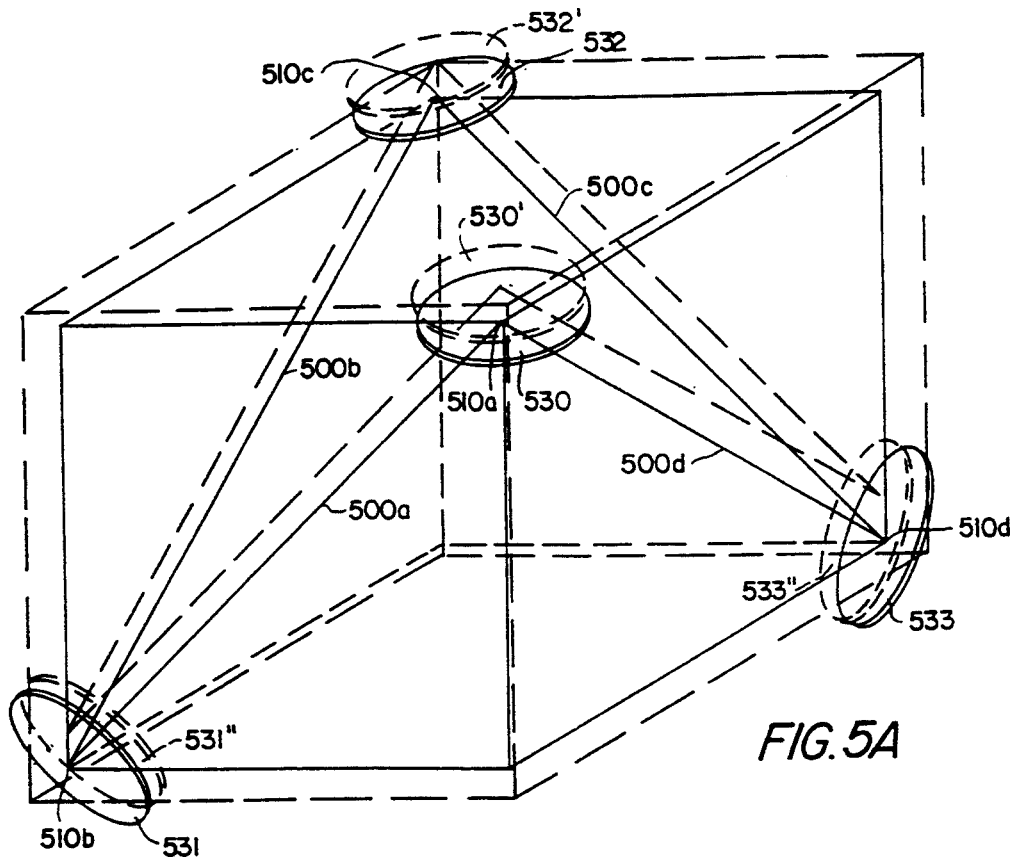
FIGS. 5A-C illustrate the solution to the backscatter problem for the path of FIG. 4A using two PLC mirrors on a symmetry plane.
Figure 5B:
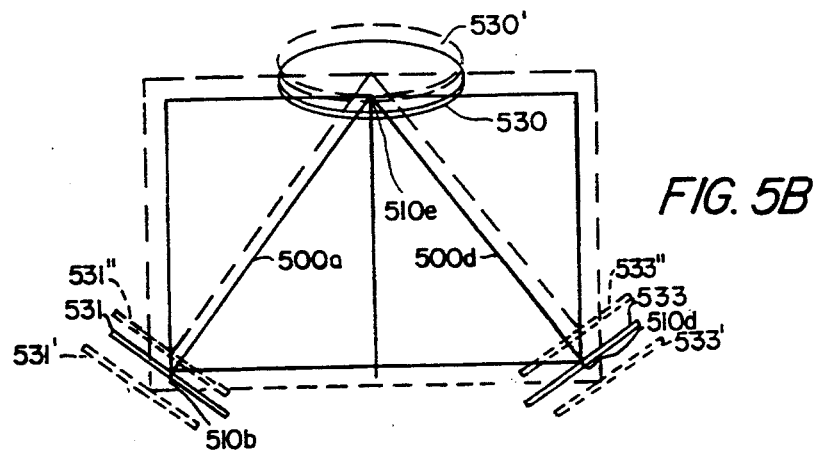
Figure 5C:
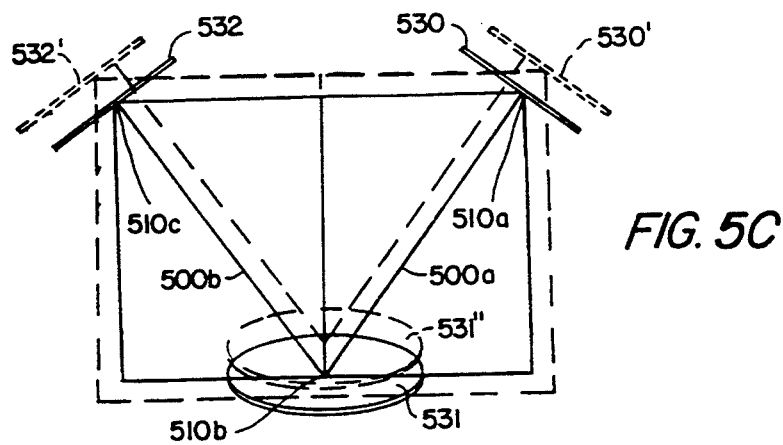

Referring now to FIG. 4A through C, there is illustrated the problem caused by movement of the beam on the mirror surfaces in the planes of incidence for the case of a nonplanar path utilizing only one PLC mirror to maintain constant pathlength. FIG. 4A is an isometric drawing showing ring path 400, comprising segments 400a, 400b, 400c and 400d, produced by appropriately placed mirrors 430, 431, 432 and 433 by reflections at locations 410a, 410b, 410c and 410d. The incidence points 410a through 410d are shown located at the apexes of cube 420 for simplifying the drawing. Path segments 400a through 400d are, then, along the diagonals of cube faces 420a through 420d. FIG. 4B is a side view taken along a first cube diagonal and it shows path 400 as seen looking along a diagonal axis such as the diagonal line going through incidence points 410a and 410c. Thus, segments 400a and 400b appear superimposed on each other on slanted cube face 420a and segments 400c and 400d appear superimposed on each other on slanted cube face 420d. Incidence points 410b and 410d are shown along with their respective mirrors. At locations 410b and 410d mirrors 431 and 433 respectively, appear edgewise in this view.

FIG. 4C is a side view of the block of FIG. 4A orthogonal to the view of FIG. 4B. Here, segments 400a and 400d appear superimposed to each other on face 420d and segments 400b and 400c appear superimposed to each other on face 420b. Mirrors 430 and 432, respectively appear edgewise in this view.

Referring now to FIGS. 4A through C, it may be seen that, upon uniform expansion of the block on which the mirrors rest, mirrors 430, 431, 432 and 433 move outward to positions 430', 431', 432' and 433'. As before, PLC mirror 431 is then made to move inward to position 431" under control of pathlength controller in order to maintain a constant pathlength. As can be seen from the three figures, this has the effect of moving path 400 upward, by an amount equal to the upward expansion of mirrors 430 and 432 and toward mirror 433, by an amount sufficient to maintain equal length segments. The latter movement of path 400 is in the plane of incidence of mirrors 430 and 432, and thus leads to a phase shift of the backscatter signal, as discussed hereinabove.

It has been found that if the contact points on the mirrors move in a directions perpendicular to the planes of incidence, the effective distribution of scatter does not change. That is, the net phase does not change and the net intensity remains substantially the same for a typical movement range. This may be better understood with reference to FIGS. 5A through C, where there is shown a nonplanar path similar to that of FIGS. 4A through C, with the exception that two PLC mirrors are used instead of just one, the two PLC mirrors being positioned opposite each other to maintain the symmetry. As before, path 500 initially comprises segments 500a, 500b, 500c and 500d having contact point on mirrors 530 through 533 at positions 510a through 510d, respectively. As mirrors 530 and 532 expand outwardly to positions 530' and 532', PLC mirrors 531 and 533, positioned along a plane of mirror symmetry, move inwardly to positions 531" and 533" to maintain a constant pathlength. As can be seen from the three figures, the correcting action of PLC mirrors 531 and 533 has the effect of moving path 500 upward by an amount equal to the upward expansion of mirrors 530 and 532. This results in a movement of the path only in a direction perpendicular to the planes of incidence of the beam on mirrors 530 through 533, and thus this has no effect on the phase of the backscatter signal as discussed hereinabove.

The path generated by mirrors 530 through 533 has two planes of mirrors symmetry, the first one passing through incidence points 510a and 510c and the second one passing through incidence points 510b and 510d. The two PLC mirrors were arbitrarily placed along the second plane of mirror symmetry. However, it is found that only one plane of mirror symmetry is necessary to confine movements of the path to a direction perpendicular to the plane of incidence on a mirror. This may be seen with reference to FIGS. 6A through C, where mirrors 630, 631, 632 and 633 form a path 600 consisting of path segments 600a through 600d having points of incidence 610a through 610d on said mirrors, said path having a plane of mirror symmetry including incidence points 610a and 610c on PLC mirrors 630 and 632. As mirrors 631 and 633 expand to positions 631' and 633', PLC mirrors 630 and 632 are made to move inwardly to positions 630" and 632" to maintain constant pathlength. That there is a proper ratio E of the relative movements of PLC mirrors 630 and 632 such that the original incident points can be maintained for the nonplanar path case, may be understood by considering the following. It may be easily shown (for nonplanar resonators) that the mirror normals $\hat{n}_i$ (where i=a, b, c, or d) uniquely determine the unit wave vectors $\hat{k}_i$ for path 600. The unit vectors $\hat{k}_i$ in turn determine the ratios of the length $L_a$ through $L_d$ of path segments 600a through 600d, i.e. $L_a/L_d$, $L_b/L_d$, and $L_c/L_d$. Since the total pathlength is maintained constant, i.e. $L_a+L_b+L_c+L_d$=constant, the individual path segment lengths $L_a$, $L_b$, $L_c$ and $L_d$ are then uniquely determined. Thus the shape and size of path 600 remain constant as it slides over the mirrors. If PLC mirrors 630 and 632 are moved inward by equal amounts, the incidence points clearly move perpendicular to the plane of incidence on mirrors 630 and 632 (owing to the symmetry) and in some other directions on mirrors 631 and 633. These latter two motions are such as to maintain the symmetry of the ring. Now, mirror 630 can be moved outward and mirror 632 can be moved inward keeping the total pathlength constant. This will cause path 600 to slide parallel to itself horizontally along mirrors 631 and 633. The motion may be chosen to make the component of motion in the direction parallel to the incidence plane on mirrors 631 and 633 zero, thus leaving only a component which is perpendicular to said incidence plane. It may be seen that the net mirror movement has the effect of moving pathlength 600 downward. This results in a movement of the path in a direction perpendicular to the plane of incidence at each mirror, thus eliminating any phase shift to the backscatter signal and, consequently, any variation in the total scatter level.

Modifications to the described embodiments will be apparent to persons skilled in the art without departing from the spirit and scope of this invention. Accordingly, it is intended that this invention be not limited except as defined by the appended claims.

What is claimed is:
1. In combination:

a ring resonator comprising four reflectors forming a path having four segments, such path being symmetrical about a plane, a first two of said path segments having a first nominal length and being incident on a first one of the four reflectors, and a second two of said path segments having a second nominal length, the second nominal length being different from the first nominal length, said second two path segments being incident on a second one of the four reflectors, said first and second reflectors being disposed on the symmetry plane of the path; and means for controlling the length of the path, such means comprising means for moving the first and second reflectors.

2. The combination of claim 1 wherein said first two path segments lie in a first plane and said second two path segments lie in a second plane.

3. A ring laser gyro comprising:

a ring resonator comprising four reflectors forming a path having four segments, a first two of said four path segments being disposed in a first plane, being incident on a first one of the four reflectors and having a first nominal length, and the remaining two path segments being disposed in a second, different plane, being incident on a second one of the four reflectors and having a second nominal length different from the first nominal length;

means for producing beams of electromagnetic energy of predetermined modes for producing an output signal; and means for controlling the length of the path segments, such means comprising means for moving said first and second reflectors.

* * * * *